United States Patent [19]
Kuzik

[11] Patent Number: 5,188,218
[45] Date of Patent: Feb. 23, 1993

[54] METHOD AND APPARATUS FOR INSTALLATION OF LARGE CONVEYOR BELTS

[76] Inventor: Larry J. Kuzik, 7576 Morrison Cr., Langley, B.C., Canada, V3A 6Y3

[21] Appl. No.: 830,615

[22] Filed: Feb. 4, 1992

[51] Int. Cl.⁵ .............................................. B65G 15/60
[52] U.S. Cl. .................................. 198/812; 198/832.3; 242/75.2; 242/75.43; 242/75.46; 242/149
[58] Field of Search ................... 198/812, 832.2, 832.3; 242/128, 75.2, 75.43, 75.46, 149

[56] References Cited

U.S. PATENT DOCUMENTS

| | | |
|---|---|---|
| 2,631,717 | 3/1953 | Cox ..................... 198/832.3 |
| 3,200,906 | 8/1965 | Bernard . |
| 3,297,126 | 1/1967 | Forney . |
| 3,667,586 | 6/1972 | Matthews ............ 198/812 |
| 4,195,726 | 4/1980 | Denny et al. . |
| 4,208,022 | 6/1980 | Wimberly . |
| 4,227,660 | 10/1980 | Denny et al. . |
| 4,314,631 | 2/1982 | Hagerman et al. . |
| 4,609,100 | 9/1986 | Fudickar et al. . |
| 4,821,873 | 4/1989 | Crane ..................... 198/832.2 |

FOREIGN PATENT DOCUMENTS 2706089 6/1978 Fed. Rep. of Germany .
881920 11/1961 United Kingdom .

Primary Examiner—D. Glenn Dayoan
Attorney, Agent, or Firm—Hughes & Multer

[57] ABSTRACT

A method for deploying a belt on a large conveyor belt system which extends down slope. A run of the belt is positioned at an upper position along the slope, and is engaged with a controllable brake which is configured to permit selective adjustment of the braking force which is exerted thereby on the belt. The belt is then lowered along the conveyor belt system using the weight of the run, and the rate at which the run of belt advances is controlled by selectively adjusting the braking force which is exerted by the controllable brake. The runs of belt may be lowered from adjacent high points in the conveyor belt system and spliced together where these meet in the valleys between the high points. The controllable brake assembly may be made up of a plate which extends across the belt and an inflatable bladder which is positioned on top of the plate and beneath its support, so that as fluid pressure is selectively added to the inflatable bladder, this biases the plate against the belt so as to control the braking force which is exerted by the plate against the belt.

23 Claims, 6 Drawing Sheets

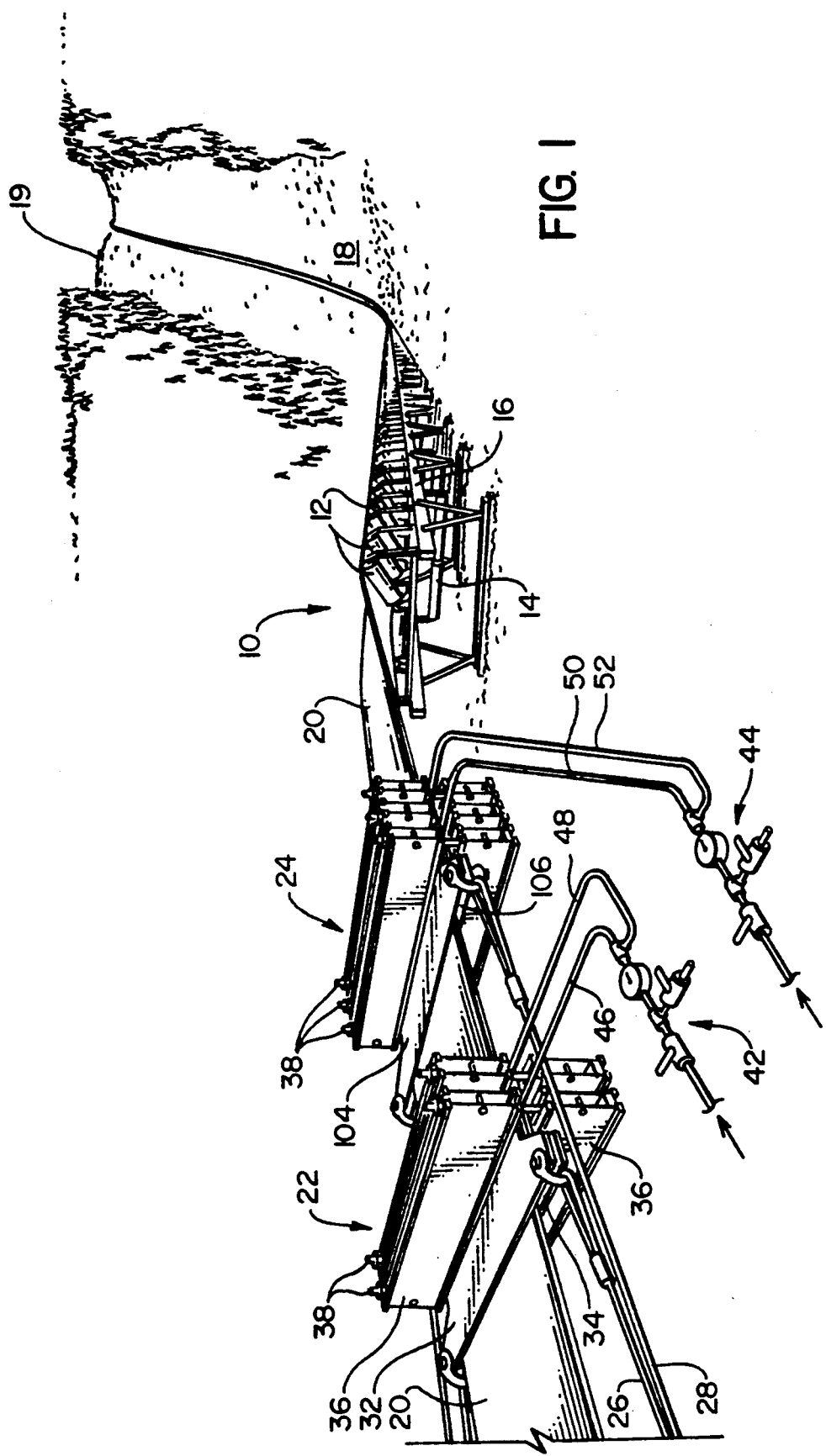

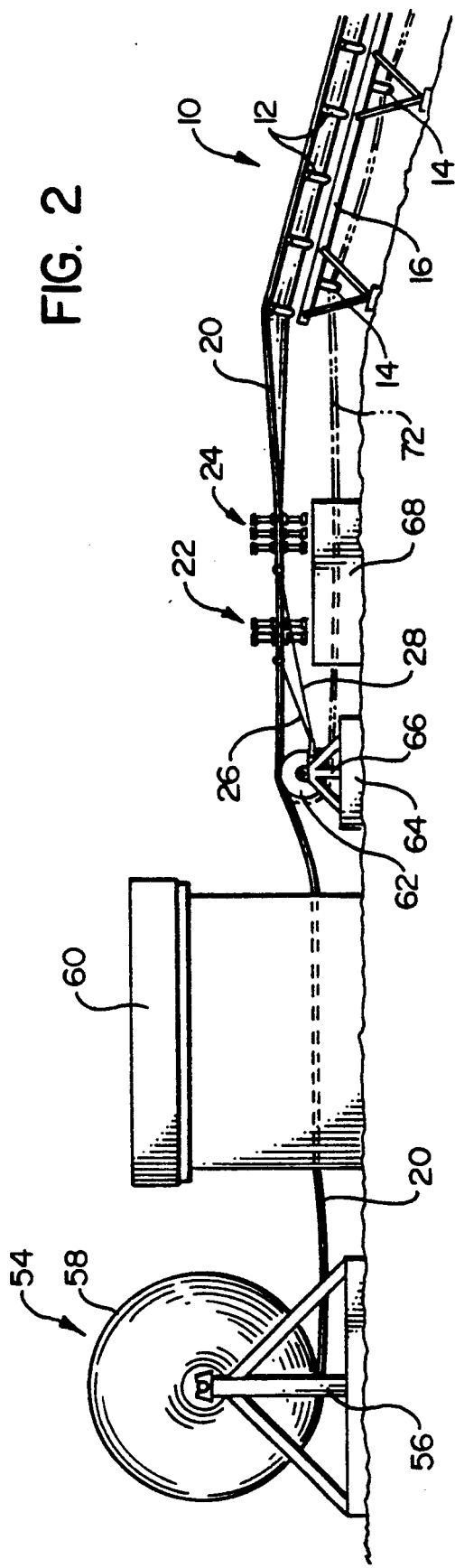

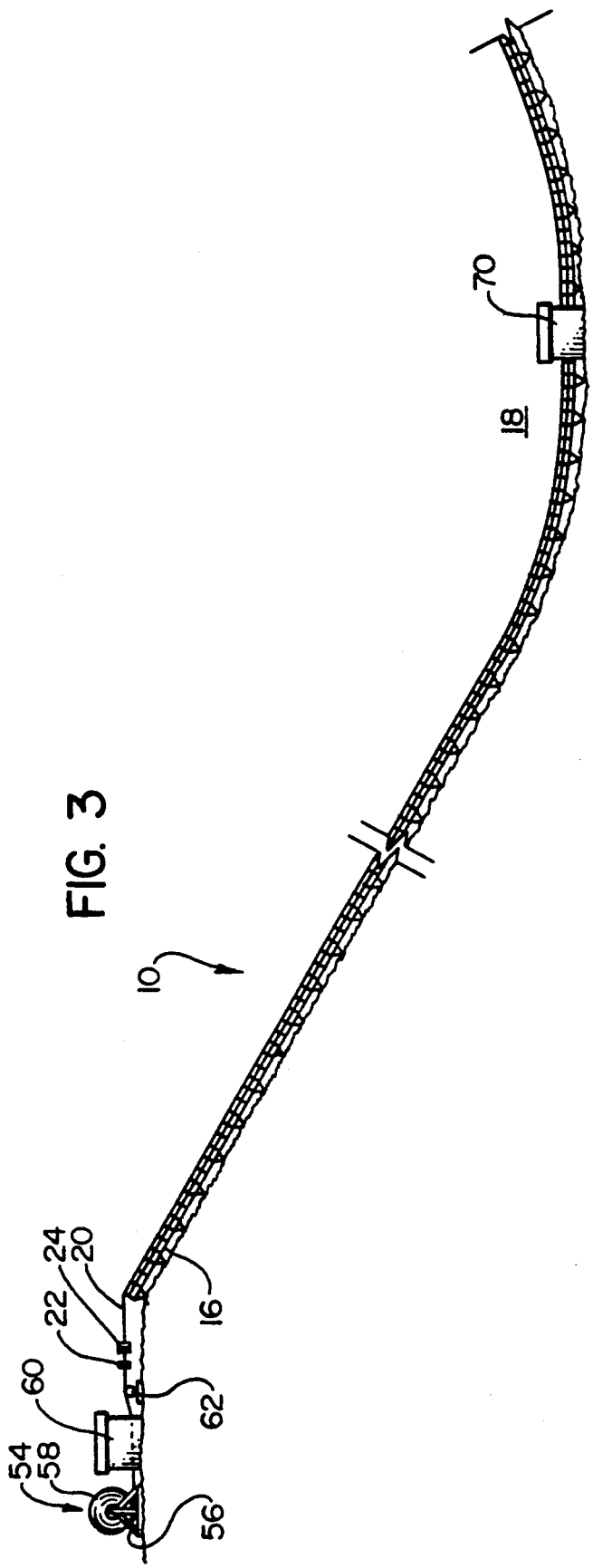
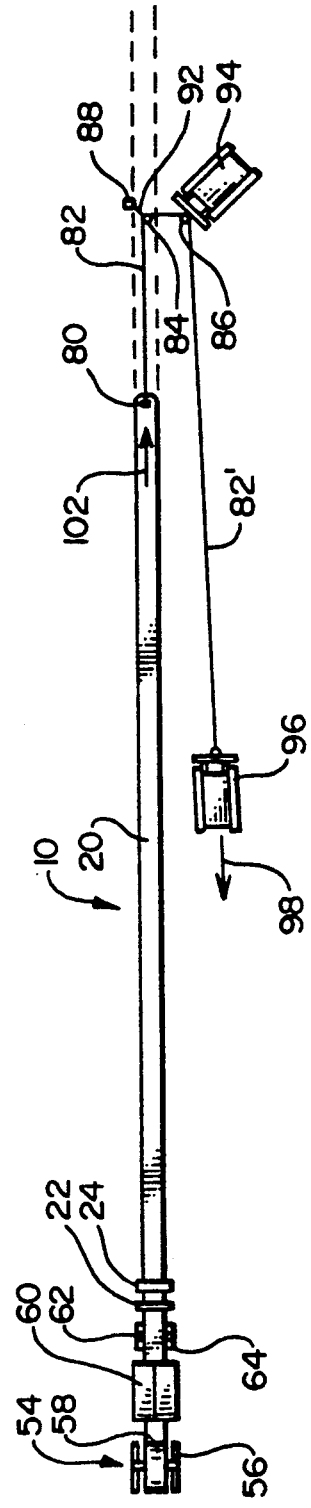

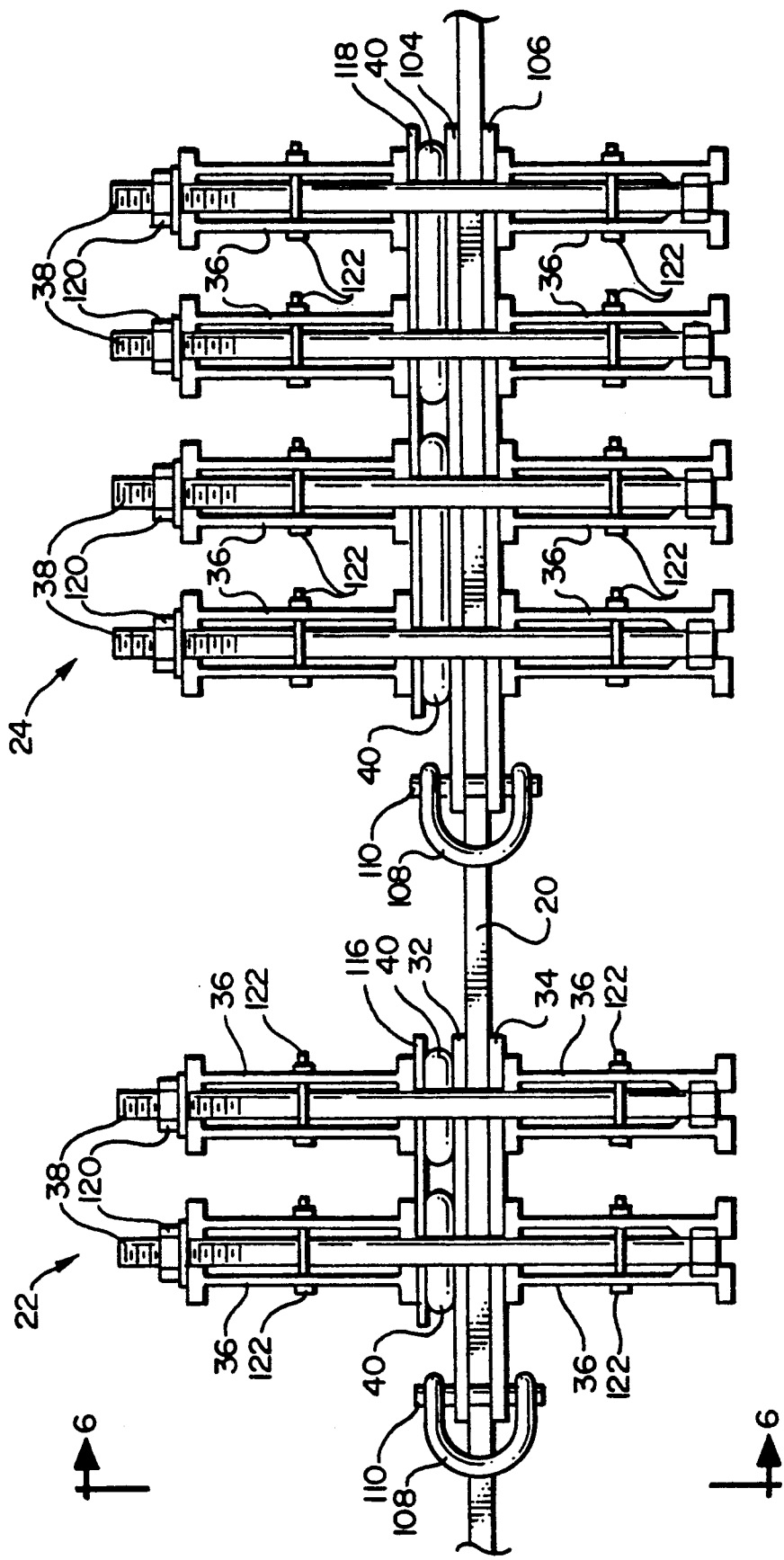

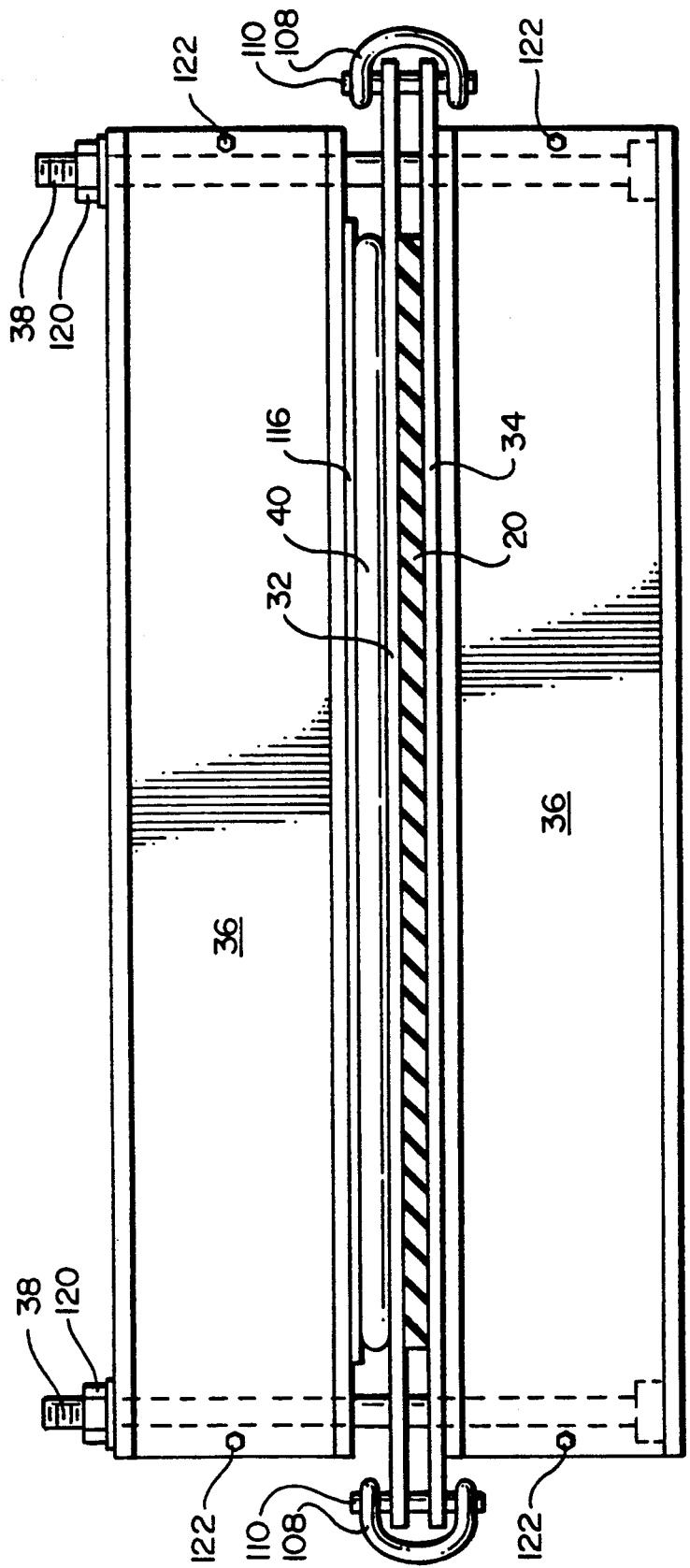

METHOD AND APPARATUS FOR INSTALLATION OF LARGE CONVEYOR BELTS

BACKGROUND OF THE INVENTION

1. Field of the Invention

The present invention relates to large conveyor belt systems which operate over inclines and declines, and the installation of the belts thereon, and, more particularly, to a method and apparatus for the installation of such belts by lowering them from elevated portions of such systems.

2. Background

Modern mining operations often employ conveyor belts to transport the mined materials from the excavation site to a remote plant for processing and/or loading. Given the scale of modern mining operations, such as the open pit techniques used for mining coal, copper and other ore, tar sands, and so forth, the proportions of these conveyor belt systems are often truly massive. To help illustrate this, FIG. 1 shows a perspective view of such a system, and how this may traverse great distances of open terrain. Individual conveyor runs are frequently several miles in length, and the belt may be several feet. Being that the belt must be able to handle the weight and impact of the mined materials, it must be very heavily constructed, typically of steel cables encased in a block or plies of rubber. For example, some belts may be better than 1.5 inches thick and some 10 feet wide, and so may weigh several hundred pounds for each yard of length. Thus, in a conveyor system which is several miles long, the weight of the belt alone may range in the thousands of tons.

Being that mining operations are frequently located in rugged terrain, the conveyor belt systems often must traverse very steep and lengthy inclines and declines. Given an elevation change of hundreds and sometimes thousands of feet, it becomes apparent that the loads which are generated by the weight of the massive runs of belt are tremendous in such a system. These loads become a very serious problem when it is necessary to install a new belt on a conveyor system, or it is necessary to repair or replace sections of an existing belt. Not only is the operation rendered exceedingly difficult and dangerous by these loads, but it can be economically disastrous for the operation of the conveyor system to be interrupted for any significant period of time while carrying out the work and setting up the heavy equipment which is required for handling these loads.

These techniques which have previously been employed to install belts on such conveyor systems have been marked by grave drawbacks and limitations. The usual approach has been to position a roll of the belt material at the bottom of the conveyor run, and then install some sort of attachment fitting on the end of the roll. The attachment fitting is then connected to a bulldozer or other vehicle so that this pulls the belt up the slope. However, the point has often been reached with modern conveyor systems where the belt is simply too heavy for any available vehicle to be able to do this. Furthermore, the slope is often much too great for the operation of a vehicle.

Attempts have been made to overcome these problems by using winches which are anchored into the earth. Typically, a series of cement foundations are poured for the winch, and the winch is moved up the slope as each roll of belt is put on the system. However, the weight of the belt necessitates the use of extremely large winches, and the process of moving these winches step-by-step up the mountain, and then anchoring and rigging them for each roll of belt, is prohibitively time-consuming and expensive. While some operators have tried to circumvent these problems by using a very large winch which has sufficient cable capacity that it can pull the belt all the way up the slope without being moved, the huge size of the drum and associated drive assembly necessary to do this renders this system excessively expensive and very difficult to transport to the top of the conveyor system, which may be located at some remote, elevated site; furthermore, when using a system of this type, the weight of the very long pull cable which is required to span the length of the run becomes a serious problem in itself.

In addition to being expensive and difficult to practice, the conventional approach of installing these belts by pulling them up the slopes, whether using a tractor or winch, is fraught with extreme danger. Since the belt is necessarily supported by the pulling device during this operation, in the event that the belt separates from the pulling device (e.g., the cable breaks or comes loose from the end of the belt), or the pulling device (e.g., the winch) becomes disengaged from its anchor, the resultant runaway belt will cause virtually certain massive destruction of equipment, as well as very possible loss of life. On a lesser scale, the fact that this technique requires the concentration of massive loads on the belt (at the attachment plate) means that this frequently results in serious damage to the structure of the belt, which may cause subsequent operational failure or at least necessitate expensive repairs.

Another serious difficulty which is encountered with these conventional installation techniques stems from the usual arrangement of the carrying and return idlers of the conveyor belt systems. As is shown in FIG. 1, the carrying idlers 12 and return idlers 14 are typically installed in a series of support structures or platforms 16. The carrying idlers 12 are frequently arranged in the form of a trough so as to shape the belt into an appropriate configuration for carrying the ore or other material, and the return idlers 14 are mounted beneath these on the underside of the support platforms 16. There is thus very little space above the return rollers 14 through which to feed the attachment fitting at the leading edge of the belt, together with its associated cable ends, shackles, and so forth, and it is also very difficult to string the cable for pulling the belt through this space, especially a cable of the size which is necessary to support the weight of such a massive belt. Even if it is possible to fit the cable through the space, the weight and inflexibility of the cable renders it an arduous and time-consuming task to thread it through each of these spaces, being that this task is normally performed manually.

It has been proposed to overcome these problems by lowering the belt downwardly from the top of the slope. However, this has not been done successfully, again because of the weight of the belt, which can lead to uncontrolled unwinding of the belt from its reel. Accordingly, the problem arises as to how to gradually lower the belt down the slope without losing control. One attempt which was made to do this involved the use of a brake consisting of heavy steel plates positioned on top of and below the belt. Bolts extended between the plates on both sides of the belt, and these were tightened manually to provide a braking force. However, this attempt failed in practice: not only was the use of manually tightened bolts to provide the braking force too slow and cumbersome to provide acceptable reaction times, but it was found that as the bolts were tightened along the sides of the belt, the middle portions of the plates deflected so that there was relatively little braking force at the center of the belt. In fact, when this deflection and the resultant loss of braking force occurred, the natural response of the operators was to further tighten the bolts, which increased the deflection and further decreased the braking force, resulting in a runaway belt.

Another approach which has been attempted to provide controlled lowering of the belt has involved the use of two separate clamp assemblies. Each clamp assembly is provided with a strongback which extends across the belt, with bolts passing through this so that force can be applied at the center of the belt as well as at the edges. The clamps are spaced apart by about 100 feet along the belt, and a winch cable is attached to the upper one. The upper clamp is tightened, using a large ratchet wrench; the lower clamp is then loosened and the upper clamp is lowered down to it using the winch, together with the belt which is held therein. The lower clamp is then tightened to hold the belt in place, and the upper clamp is loosened and pulled back up to its upper position so that the process can be repeated. While this technique enjoys certain advantages over some of its competitors in terms of control, it is obvious that this "inchworm" process, which advances the belt only some 100 feet at a time, is very time consuming and inefficient, especially when dealing with belt runs which are several miles long. Furthermore, this process still requires the use of a massive winch which is capable of handling the weight of the belt, and the need to install this at the top of the belt run. Also, the technique requires that 100 feet of open space be available on the belt, and in many cases this simply does not exist.

As an incidental matter, while applicant is aware that the techniques described in the preceding two paragraphs have been attempted in various parts of the world, no admission is made that these constitute prior art with respect to the present invention. Rather, these approaches are described here to illustrate the ongoing and generally unsuccessful attempts which are being made to solve the problem of how to install belts on these very large conveyor belt systems.

Accordingly, there exists a need for a method and apparatus for installing belts on very large conveyor belt systems which avoid the need to pull the belt up inclines when installing it. Furthermore, there exists a need for such a method and apparatus which provides for controlled, lowering of the belt from the top of inclines or declines, and for the effective and rapidly adjustable application of braking force for doing this. Still further, there exists a need for an apparatus for providing such an effective and rapidly adjustable braking force, and which applies that braking force across the entire width of the belt, instead of applying a braking force which is concentrated at the side edges of the belt.

SUMMARY OF THE INVENTION

The present invention has solved the problems cited above, and comprises generally a method for deploying a belt on a conveyor belt system which extends down a slope. The method comprises the steps of positioning a run of belt at an upper position along the slope, and engaging this with controllable brake means which are configured to permit selective adjustment of the braking force which is exerted thereby on the belt. The run of belt is lowered along the conveyor using the weight of the run, so that a leading end of this advances from the upper position to a lower position along the slope, and the rate at which the belt advances along the conveyor belt system is controlled by selectively adjusting the braking force which is exerted by the brake means.

The weight of the run of belt may be used to unwind the belt from the roll, and the method may further comprise the steps of unwinding the roll until the tail end is reached, increasing the braking force so as to stop the run of belt with the tail end at the upper position along the slope, positioning a second roll of belt at the upper position, unwinding the free end of the belt from the second roll and splicing it to the tail end of the first run of belt, and then reducing the braking force so as to continue lowering the belt as it is unwound from the second roll.

The lower position along the slope may be a low point in the conveyor belt system, between adjacent high points, and the method may further comprise the steps of lowering a second run of belt from the second upper position so that the leading end of this second run also advances to the lower position, and then splicing the leading end of the second run of belt to the leading end of the first run of belt where these meet.

The step of engaging the run of belt with the brake means may comprise positioning the belt in frictional engagement with at least one substantially stationary plate which extends across the belt, positioning an inflatable bladder intermediate the plate and support means, and selectively adding fluid pressure to the inflatable bladder so as to bias the plate against the belt and so control the braking force which is exerted thereby.

The step of engaging the belt with controllable brake means may comprise engaging the belt with first and second brake assemblies. The braking force which is exerted by the first brake assembly may be set at an amount which retards but still permits the advance of the run of belt under the weight thereof, and the braking force which is exerted by the second brake assembly may be selectively adjusted so as to selectively increase and decrease the rate of advance. The first and second brake assemblies may be spaced apart from one another longitudinally with respect to the run of belt, and the forward of these may be used for increasing and decreasing the rate of advance.

There is also an apparatus for deploying a run of belt on a conveyor belt system which extends down a slope, this apparatus comprising means for lowering the run of belt along the conveyor belt system using the weight of the run of belt, controllable brake means for engaging the belt at an upper position along the slope and being configured to permit selective adjustment of the braking force which is exerted thereby, tension means for applying tension to a leading end of the run of belt at a lower position along the slope, and means for selectively adjusting the braking force which is exerted by the brake means so as to control the rate at which the run of belt advances down the slope.

The means for lowering the run of belt along the system may comprise a reel assembly for rotatably supporting a roll of the belt, this being positionable adjacent the upper position along the slope so that the weight of the run of belt unwinds it from the roll. The tension means may comprise a cable connected to the leading end of the run of belt, and means for pulling the cable so as to apply the tension to the belt. This pulling means may be motive means connected to the cable, such as a vehicle.

There is also controllable brake for engaging a run of belt so as to control the rate at which the belt advances as it is lowered along a conveyor belt system which extends down a slope. This controllable brake comprises at least one substantially stationary plate means which is configured to extend across the width of the belt so as to frictionally engage it. First support means are positioned on a side of the plate means opposite the belt, and an inflatable bladder is positioned intermediate the support means and the plate means, and extends laterally across substantially the entire width of the belt, so that the plate means is biased against the belt in response to an increase in fluid pressure in the bladder, which results in a braking force being exerted against the belt. Means are provided for selectively adjusting the fluid pressure in the inflatable bladder so as to selectively adjust the braking force, so as to thereby control the rate at which the run of belt advances through the brake and down the slope.

The stationary plate means may comprise first and second rigid plates positioned on opposite sides of the belt, with second support means being positioned on a side of the second plate opposite the belt for holding this against the belt. The support means may be a plurality of spaced apart beams which extend laterally with respect to the belt, and the beams of the upper and lower support may each be aligned with one another, with bolts and nuts interconnecting these beams on each side of the belt, these being adjustable so as to space the support means apart when the bladder is contracted so that the belt can move freely between the plates.

The plates, support means, and inflatable bladder may be configured to be supported as an assembly by the belt as this is tensioned by the weight of the run which extends down the slope, so that the assembly floats on the belt as the run advances therethrough. Anchor means may be provided for holding the assembly in a substantially stationary position as the brake assembly floats on the belt, and this anchor means may comprise an anchor mounted to the earth and a flexible cable connecting the anchor to the assembly so as to permit the assembly to move vertically as the tension on the belt increases and decreases.

BRIEF DESCRIPTION OF THE DRAWINGS

FIG. 1 is a perspective view of a typical large conveyor belt system, on which the carrying run of the belt is being installed in accordance with the present invention, showing in the foreground the braking apparatus which provides for the controlled lowering of the belt;

FIG. 2 is a side elevational view of the belt installation facilities at the top of a slope of the conveyor belt system, this showing the braking system towards the right of the drawing, a roll of belt material towards the left of the drawing, and a splice house positioned between these for splicing together successive lengths of belt as these are unrolled;

FIG. 3 is a side elevational view of the conveyor belt system of FIGS. 1-2, showing the installation facilities at the upper end of the slope and a second splice house at the bottom of the slope, this being a valley area between adjacent high points in the system;

FIG. 4 is a simplified top plan view of the conveyor belt system of FIGS. 1-3, showing the use of a tractor to maintain tension on the leading end of the belt as this is being lowered onto the system, and a pair of snatch blocks which are used to align the cable which applies this tension;

FIG. 5 is a side elevational view of first and second brake assemblies which are positioned in series on the belt to control the rate at which it is lowered, these having inflatable bladder portions which generate the braking force against the belt;

FIG. 6 is an endwise cross-sectional view of the forward brake assembly shown in FIG. 5, showing the manner in which the inflatable bladder extends across the entire width of the belt.

DETAILED DESCRIPTION

Figure 7:
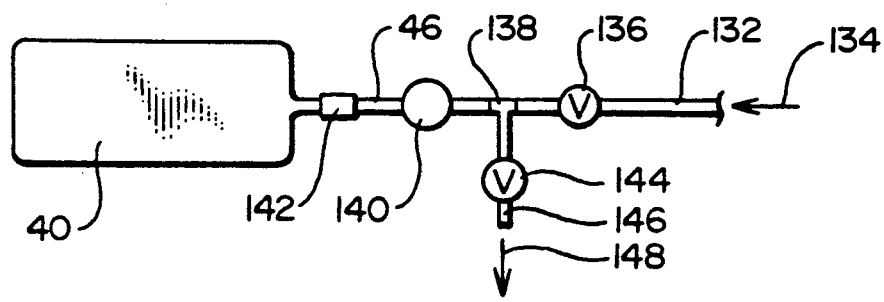
FIG. 7 shows the arrangement of control valves for controlling the pressure in the inflatable bladder so as to selectively adjust the braking force which is applied to the belt.

As noted above, FIG. 1 shows a conveyor belt system 10 which extends down a slope to a valley area 18, and then upwards again over a nearby ridge 19. In this case, a new run of belt 20 is being installed along the carrying side of the system, and so is being lowered along the through-shaped carrying idlers 12.

Seen in the foreground are forward and rearward brake assemblies 22 and 24 in accordance with the present invention, which exert braking force on the conveyor belt to control it as it is lowered. These are retained by cables 26 and 28, respectively, to suitable anchor points (not shown in FIG. 1). As will be described in greater detail below, the rear brake assembly 24 may be set to exert a steady braking force which retards the motion of the belt to a degree as it is lowered, and then the forward brake assembly 22 is used to start and stop the belt, and to increase and decrease the speed at which it is deployed. Furthermore, the use of two brake assemblies provides a level of redundancy which enhances the safety of the operation; in other words, in the event of failure of one of the brake assemblies, the operator will still be able to control and stop the deployment of the belt using the remaining brake assembly.

The structure of the brake assemblies will be described in greater detail below, but, in overview, each of these comprises generally a pair of flat plates 32, 34 which slidingly abut the surface of the conveyor belt 20, with a series of laterally-extending "I" beam-shaped strongbacks being positioned against the outer sides of these to provide support and distribution of force. A series of bolts extend between the ends of aligned pairs of upper and lower strongbacks to hold the assembly together. Inflatable bladders 40 (not shown in FIG. 1, but shown in FIGS. 5-7) are positioned between the upper strongbacks 36 and the upper plate 32 for exerting braking force against the belt when inflated. Inflation of the bladders is controlled by a separate control valve assembly 42, 44 for each brake assembly 22, 24, so as to permit an operator to selectively inflate the bladders in each of the brake assemblies, and so control the braking force which is exerted thereby. These valve assemblies 42, 44 are connected to the inflatable bladders by flexible hoses 46, 48, 50, 52. As is thus apparent from FIG. 1, there are multiple inflatable bladders in each brake assembly 22, 24, and each of these bladders is provided with its own inflation hose, which provides for additional system redundancy and enhanced safety.

As is perhaps more clearly shown in FIG. 2, brake assemblies 22, 24 are installed at the upper end of the slope which is traversed by the conveyor belt assembly 10. Also positioned at the top end of the slope is a reel assembly 54, this being made up of a stand assembly 56 which supports the roll 58 of conveyor belt 20 which is to be installed. Positioned between reel assembly 54 and the brake assemblies 22, 24 is a splice house 60. Splice house 60 provides a sheltered area in which personnel can work to form the splices which join the successive lengths of conveyor belt 20 as these are unwound from the rolls and fed onto the conveyor belt system.

The free end of belt 20 is unrolled from the bottom of roll 58 (or from the top in some cases, as when installing the belt on the upper run), and is drawn through splice house 60. From here, it is led onto the conveyor belt assembly 10; to facilitate the installation of the belt, and the placement of the brake assemblies, the first few sets of idlers and their associated support platforms may be removed so as to form a gap between the uppermost of the idlers and the head roller 62 of the conveyor belt system. Head roller 62 is typically mounted to the ground by a massive anchor 64 and support structure 66, and this provides a convenient anchor point for the cables 26, 28 which hold brake assemblies 22, 24 in place; although (for convenience of illustration) both cables 26, 28 are shown in FIG. 2 as being attached to a single anchor (for convenience of illustration), it will be understood that it is preferable for these cables to be connected to separate anchors, once again to provide redundancy by guarding against possible failure of an anchor. Also for convenience of illustration, the cables 26, 28 are shown tending downwardly from the brake assemblies to the anchor attachment points; it will be understood, however, that it is preferable for these anchor cables to be mounted so that they extend as straight back in the plane of the belt as possible, so as to avoid undesirable downward deflection of the brake assemblies when braking forces are applied.

Preferably, a temporary pad 68 is fabricated (e.g., of wood), on which the brake assemblies 22, 24 rest when the tension is off of the belt 20. When tension is applied to belt 20 by the weight of the run of the belt which has been lowered down the system (or possibly by the application of tension to the leading end thereof), the brake assemblies 22, 24 rise upwardly as the belt straightens, and float a short distance (e.g., 1-2 inches) above the top of pad 68 throughout the lowering operation. Of course, when installing the return run of the belt on the lower side of the conveyor belt system, the height of pad 68 is simply reduced as required.

In general, it is preferable for the belt to extend in a more-or-less straight line from head roller 62, through brake assemblies 22, 24, and onto the first idler run; if this cannot be done, and it occurs that (as is shown in FIG. 2) the belt extends through a downward angle from the plane occupied by the head roller and brake assemblies to that of the first support platform 16, a temporary support roller (not shown in FIG. 2) may be installed adjacent the upper end of the first support platform so as to prevent the weight of the belt from collapsing the end of the platform.

Having described the major components employed by the present invention, a method of installing a belt in accordance with the present invention will now be described with reference to FIGS. 3-4. FIG. 3 shows the roll of belt 58, splice house 60, head roller 62, and brake assemblies 22, 24, positioned as described above at the top of a slope which is traversed by conveyor belt system 10. For ease of illustration, the distance of the run down the slope is shown very much abbreviated in FIG. 3, being that this may be several miles in length, and also the steepness of the slope may vary significantly from that shown. Positioned at the bottom of the slope, in valley area 18, is a second splice house 70. This second splice house permits splices to be made at the low point in the conveyor belt system, thus (as will be described below) eliminating the need to pull the belt upslope anywhere in the system.

A first portion of belt 20 is unrolled from reel assembly 54 and led through splice house 60, over head roller 62, and through the spaced-apart plates of the two brake assemblies 22, 24. This leading end portion of belt 20 is then lowered down the carrying idlers of conveyor belt system 10 from the top of the slope, with relatively light tension being applied to the leading end of the belt by means of a cable, as will be described below. When a sufficient amount of belt has been started down the slope, the weight of this alone will be great enough to unroll the belt from reel assembly 54. The operator controls the rate at which this happens, and thus the rate at which the belt advances down conveyor belt system 10, by selectively adjusting the braking force which is applied to the belt by the two braking assemblies 22, 24.

Each roll 58 contains a limited length of belt (e.g., 1000-1500 feet); when the tail end of each roll is reached, the operator employs brake assemblies 22, 24 to stop belt 20 so that its upper end is positioned within splice house 60. A new roll of belt is then installed in the reel assembly (typically using a crane), and the leading end of this roll is unwound and led into splice house 60, where it is spliced to the tail end of the preceding length of belt, using conventional splicing techniques which are known to those skilled in the art. This process is repeated, perhaps many times, until the leading end of the new belt 20 reaches the valley area 18. This leading end is then positioned within the second splice house 70, and then another run of belt is lowered down the carrying side of conveyor belt system 10 in the opposite direction from the next summit (e.g., ridge 19 shown in FIG. 1), using essentially the same technique described above. When the leading end of the belt coming from the opposite direction reaches the valley area 18, this is also positioned in splice house 70, and then the leading ends of the two downhill runs of belt are spliced together to complete the installation of a continuous run of belt on the carrying side of the conveyor system 10.

After the installation of the belt on the carrying side of the system, this belt is stopped off, and then the process is repeated to install the belt on the return side of the conveyor belt system. This is done by relocating the brake assemblies 22, 24 as necessary, and then feeding the belt through these and over the return idlers of the system at the upper end of the slope, as shown by phantom line image 72 in FIG. 2. The successive lengths of belt 20 are again spliced together in splice house 60 as these are lowered down the slope, until the leading end reaches splice house 70, where it meets the leading end of a run of belt which is lowered down the return side of the system in the opposite direction from the next summit. Once this has been done, the upper end of the belt on the return side is cut and mated to the upper end of the belt on the carrying side in splice house 60, and the same thing is done at the other end of the system. The belt is then tensioned, preferably at the low tension point in the run (i.e., in the valley area 18 in the example shown in FIG. 1), so that the belt tensioner or takeup of the system will be in the required position for satisfactory operation; by tensioning the belt at the low point in the system, the need to hold the belt in position while doing this is obviated because the ends of the belt are simply "hanging" in this area, and also, the weight of the belt serves to essentially pretension the belt, thus removing the "stretch" therefrom. After tensioning, the final splice is made at the low point in splice house 70, and any support platforms and idlers which may have been removed to facilitate the installation process are reinstalled.

While the foregoing discussion has described an exemplary installation procedure in which the belt is installed on the carrying side of the conveyor assembly first, and then on the return side, it may be preferable in some situations to reverse this sequence. This may be desirable in some circumstances in that it provides for easier access to the belt as it is being installed on the return side of the system, inasmuch as this access is not then obstructed by a run of belt on the carrying side, as would be the case if the carry side was installed first.

As was noted above, it is preferable that a relatively light tension be applied to the leading end of the belt as this is lowered down a hill. Generally, this is not to "pull" the belt down the slope, being that the weight of the belt alone is sufficient to do this, but rather this accomplishes two other significant functions. Firstly, this tension serves to keep the belt in alignment with the conveyor system as it is lowered down the idlers; this is very important because there is typically very little clearance between the edges of the belt and the skirt boards which are adjacent to it on either side, and any contact of the belt with the skirt boards or any other fixed structure of the system may seriously impede the installation process and also damage the belt, being that the frictional forces typically generated by such contact are very great. Secondly, the belt material, although very thick and heavy, is nevertheless flexible, and has a tendency to sag or "dip" down between adjacent idlers, particularly on the return side of the system, since this lacks the "troughing" which helps the belt support itself on the carrying side; the tension applied to the end of the belt helps overcome this tendency to sag by keeping the leading end lifted up more horizontally, and so prevents this end from striking idlers or otherwise jamming during the installation process.

An exemplary technique for applying this tension to the leading end of belt 20 is illustrated in FIG. 4, in which the support platforms and idlers of the conveyor belt system are shown in phantom. In this embodiment, the tension is applied by a vehicle, such as a tractor or bulldozer, although it should be understood that the tension may also be applied by means of winches or like devices. Here, an attachment point 80 is established at the leading (downhill) end of belt 20, and a cable 82 is attached to this. Being that this attachment point and cable are intended to apply only a relatively slight tension, and are not required to pull the belt uphill as is done in the conventional installation methods described above, detachment point and cable can be relatively light and easy to handle, and can also be small enough to fit through the relatively tight space above the return side idlers. Also, because heavy tension loads are not exerted at the attachment point, the danger of damage to the belt structure is avoided.

Cable 82 is led through first and second snatch blocks 84, 86; the first snatch block 84 is connected to a suitable anchor point 88 adjacent the conveyor system by a short tether 92, and the second snatch block 86 is mounted to a bulldozer 94 or other suitable vehicle. The short tether 92 is sized to enable the first snatch block 84 to be positioned over the run of conveyor belt system 10 so that cable 82 is longitudinally aligned therewith, and so that the tension which is applied to cable 82 consequently maintains the leading end of belt 20 in alignment on the system. The arrangement of snatch blocks makes it possible to exert the pull straight down the path of system 10 using a vehicle, being that it would not be possible to operate the vehicle directly down the path which is occupied by the support structures of the conveyor belt system. By mounting the second snatch block on a vehicle, mobility of the system is enhanced and minor adjustments in the position of the first snatch block 84, and thus the alignment of cable 82, may be made by moving the vehicle; it should be understood, however, that the second snatch block 86 could be also mounted to a fixed anchor point. The leading end portion 82' of cable 82 is led through the second snatch block and to a second vehicle, such as the second bulldozer 96 which is shown in FIG. 4. This vehicle then proceeds in the direction indicated by arrow 98, so as to apply tension to the leading end of belt 20 as this advances in the direction indicated by arrow 102. It will thus be understood that the arrangement of the first and second snatch blocks 84, 86 permits the second vehicle 96 to proceed in whatever direction is allowed by the terrain, while still applying tension to the end of the belt in a direction which is in alignment with the conveyor belt system. In other words, the pull can be exerted from a direction which is independent of the alignment of the system. It should also be understood that in many terrains a heavy-duty traction vehicle such as bulldozer 96 is advantageous for applying the tension, while in other types of terrain a wheeled vehicle may be preferable, especially since its limited traction lessens the likelihood that excessive tension might accidentally be applied to cable 82.

A detailed description of the braking assemblies employed in the present invention will now be given with reference to FIGS. 5–7. FIG. 5 shows a side view of the forward and rear braking assemblies 22, 24, as these are positioned on belt 20. As was noted above, the forward brake assembly 22 is provided with upper and lower spaced-apart brake plates 32, 34, which are positioned against the upper and lower sides of belt 20 in frictional engagement therewith. Similarly, the rearward braking assembly 24 is provided with spaced-apart upper and lower brake plates 104, 106. Inasmuch as braking assembly 24 differs from braking assembly 22 only in that the plates are increased in size, and the number of strongbacks and inflatable bladders are correspondingly increased, the description hereinafter will be directed to the forward braking assembly 22 with the understanding that this applies to assembly 24 as well, and that like reference numerals refer to like components in these two assemblies.

At the forward edges of the brake plates 32, 34 and 104, 106, on either side of the conveyor belt, clevises 108 are attached to the plates by means of pins 110 which pass therethrough. These clevises 108 provide attachment points for the flexible cables 26, 28 which are connected to the anchors for the braking devices. This consequently serves as a tie-down means for maintaining the position of the braking assemblies when the belt moves, yet which also permits some vertical movement of the brake assemblies as these rise up and float on the belt when it is tensioned. Positioned on top of the upper brake plates 32, 104 are the inflatable bladders 40. Preferably, bladders 40 may be expandable, elastomeric bags which extend across the entire width of the belt, and as was noted above, at least two bladders are preferably provided for each brake assembly so as to provide system redundancy. A relatively thin tray plate 116 (118 in assembly 24) is positioned on top of the inflatable bladders 40 so as to distribute the forces between the inflatable bladders and the supporting strongbacks 36 which are positioned on top of the tray plate. The strongbacks 36 are formed generally in the shape of "I" beams, and extend across the plates laterally with respect to the conveyor belt. The upper strongbacks 36 are aligned with and mated to lower strongbacks 36 which extend across and abut the lower brake plates 34, 106. As can be seen in FIG. 6, the outer ends of the strongbacks extend laterally beyond the outer edges of the belt 20, and are joined by vertically extending bolts 38; preferably, the head of each bolt is received in the lower strongback and the threaded tail of the bolt extends through the upper strongback, to which it is secured by a nut 120, thus affording easy access to the nuts. The nuts permit adjustment of the space between the upper and lower strongbacks, and are normally adjusted so that the conveyor belt 20 can move freely between the plates when the inflatable bladders 40 are deflated or contracted. Bolts 36 may thus be loose when the bladders are deflated, and so retaining pins 122 are provided to prevent the bolts from falling out of the ends of the strongbacks.

It has been found preferable to form the major metallic components of the brake assemblies—the brake plates, bag trays, strongbacks, etc.—of a suitable lightweight alloy, such as high-tensile aluminum. The resulting reduction in weight (relative to using steel for these components) is advantageous, not only from the standpoint of handling ease, but also because this makes it easier for the assembly to float on the belt as described above, and minimizes unknown friction factors which may be caused by the weight of the assembly resting on the belt.

The force exerted on a belt by a particular brake assembly can be calculated from the relationship: $F = A \times P \times \mu$, wherein "A" is the area of the plates, "P" is the pressure in the bladder, and "$\mu$" is the coefficient of friction, this in particular giving "F" as the force which the brake assembly applies at the "slip" point, when the belt transitions from a static condition to a dynamic condition; after this transition the coefficient of friction decreases so that the pressure must be increased somewhat to compensate. In general, it has been found preferable to configure the brake assemblies with the area "A" of the plates and bladders being relatively large, so as to minimize the pressure which must be exerted to obtain the desired braking force, since this reduces the potential for damaging the belt. For example, a typical size for bladders 40 may be 20" by 60" each, with multiple bladders being installed in each brake assembly to provide sufficient area that the required force can be generated using a relatively low pressure, such as 5–10 psi. The pressure can be applied to the bag by means of hydraulic fluid or pneumatic pressure. The pressure is adjusted as necessary to control the velocity of the belt as it is deployed down the incline.

As noted above, the bladder pressure of the rear brake assembly 24 may be set so that that assembly applies a steady braking force which checks or retards the motion of the belt, but still permits the belt to slide therethrough. The operator then controls the bladder pressure in the forward brake assembly 22 so as to increase or decrease the speed of the belt. Of course, as more belt is paid out, the load will become greater and so tend to increase the velocity of the belt; as this occurs, the operator may increase the pressure in the forward brake assembly 22 to slow the belt down, step up the pressure in the rear brake assembly 24 to increase the steady braking force which is exerted thereby, and then ease off the pressure in the forward brake assembly 22 again so as to bring the velocity of the belt back up to the desired level. Of course, if the operator desires to stop the belt altogether, he can simply increase the pressure to the necessary level; because the bladders extend continuously across the full width of the belt (as shown in FIG. 6), the problem of reduced braking effectiveness due to brake plate deflection does not occur. Furthermore, in the event of failure of one or the other of the braking assemblies 22, 24, the operator can use the remaining assembly as an emergency brake to stop the belt, each of the brake assemblies being sized to be able to exert sufficient braking force to do this.

Turning to FIG. 7, the control system for inflating-/deflating the bladders 40 will now be described. FIG. 7 is a schematic view, and shows one of the bladders 40. Fluid pressure is supplied through supply line 132 in the direction indicated by arrow 134, with this flow being controlled by a valve 136 (for example, a simple, hand-operated ball valve). Valve 136 is connected via a "T" fitting 138 to a pressure gauge 140, and this, in turn, is connected via one of the flexible hoses 46 to the inflatable bladder, which is connected to the flexible hose by high pressure attachment fitting 142. The other leg of the "T" fitting is connected by another valve 144 (e.g., another hand-operated ball valve) to an exhaust line 146.

Thus, when the operator desires to inflate bladder 40 so as to increase the brake pressure which is exerted thereby, he closes valve 144 and opens valve 136, monitoring the pressure in bladder 40 by means of pressure gauge 140. When the desired pressure and braking force has been achieved, he closes valve 136. Then, when it is desired to deflate the bladder, and so decrease the brake pressure which is exerted thereby, the operator opens valve 144 while keeping valve 136 closed, so that the fluid pressure in bladder 40 escapes via exhaust fitting 146 in the direction indicated by arrow 148. The operator can thus control the brake pressure which is exerted by the brake assembly, and so can control the velocity of the belt, by selectively opening and closing valves 136 and 144. As a safety measure, when the belt has been brought to a complete stop by increasing the fluid pressure, and it is desired to keep the belt in this position for a sustained period of time (as for making a splice), a threaded cap 150 (see FIG. 1) can be installed temporarily on the end of exhaust line 146 so as to prevent the escape of fluid pressure therethrough.

From the foregoing, it will be seen that this invention is one well-adapted to attain all the ends and objects set forth herein. In addition to the advantages which have been discussed above, advantages which are exhibited by the present invention may be summarized as follows:

(1) All frictions and resistances encountered when lowering the belt are subtracted from the load— This to be contrasted with the situation which occurs when employing the technique of pulling the belt up the slope, in which all frictions and resistances are added to the loads, thus increasing the difficulty and danger of the operation. These resistances may stem from many sources, such as the varying friction of rollers and pulleys, the resistance of turning the belt roll, friction from belt edge rub, and resistance due to belt sag between rollers. Because these resistances are actually subtracted from the load when installing a belt in accordance with the present invention, this renders the installation far safer and easier.

(2) Hang-up of belt means that belt only stops with no danger—When using the previous technique of pulling the belt up the slope, any hang-up of the cable or the pull plate at the end of the belt can cause disaster, such as a parting of the belt from the cable, leading to a runaway belt. By contrast, when using the method of the present invention, any hang-up of the belt causes the belt to stop until the problem can be sorted out, without causing any danger.

(3) Force on belt is limited to very low pressure over large surface area of belt, minimizing likelihood of damage—By contrast, the previous technique requires exerting a heavy pull on a concentrated area of the leading edge of the belt, and, unless extreme care is taken to ensure that even tension is exerted on all of the cables, damage to the belt will result.

(4) Only one equipment setup is required for installing the belt on each slope—The technique of employing anchored winches to pull the belt up the slope involves the expenditure of many manhours and much material in moving the winch step-by-step up the slope, and rigging and unrigging the equipment at each of these stages.

(5) Low risk operation: risk elements are confined to the restraining brake area—When using the technique of pulling the belt up the slope, problems which may result in a lost belt can develop in many different areas (e.g., the winch foundation, the pull plate on the belt, belt hang-up along the conveyor system, etc.). By contrast, when using the method of the present invention, only the brake assemblies and their associated fittings need to have a high safety factor, and, being that these are all located in a single area, they can be readily monitored by supervisory personnel.

Inasmuch as many possible embodiments may be made of the invention without departing from the scope thereof, it is to be understood that all matter herein set forth or shown in the accompanying drawings is to be interpreted as illustrative and not in a limiting sense. It will be understood that certain features and subcombinations are of utility and may be employed without reference to other features and subcombinations. This is contemplated by and is within the scope of the claims.

What is claimed is:

1. A method for deploying a belt on a conveyor belt system which extends down a slope, said method comprising the steps of:
    positioning a run of said belt at an upper position along said slope;
    engaging said run of said belt with controllable brake means, said controllable brake means being configured to permit selective adjustment of braking force which is exerted by said brake means on said run of said belt;
    lowering said run of said belt along said conveyor belt system using the weight of said run, so that a leading end of said run advances from said upper position along said slope to a lower position along said slope; and
    controlling the rate at which said run of said belt advances along said conveyor belt system by selectively adjusting said braking force which is exerted by said brake means.

2. The method of claim 1, wherein the step of engaging said run of said belt with said brake means comprises:
    positioning said belt in frictional engagement with at least one substantially stationary plate which extends across the width of said belt;
    positioning an inflatable bladder intermediate a one of said plate and a support means; and
    selectively adding fluid pressure to said inflatable bladder so as to selectively bias said plate against said belt which is in frictional engagement therewith, so as to control said braking force which is exerted by said stationary plate against said belt.

3. The method of claim 1, further comprising the step of unwinding said run of said belt from a roll of said belt using said weight of said run, so that said run of said belt advances down said slope as said roll is unwound.

4. The method of claim 3, further comprising the steps of:
    unwinding said roll until a tail end of run is reached at said upper position along said slope;
    increasing said braking force so as to stop said run with said tail end at said upper position;
    positioning a second roll of said belt at said upper position along said slope;
    unwinding a free end of said belt from said second roll;
    splicing said free end of said belt from said second roll to said tail end of said run; and
    reducing said braking force so as to continue lowering said run of belt as said belt is unwound from said second roll.

5. The method of claim 1, wherein said lower position along said slope to which said leading end of said run advances is a low point in said conveyor belt system, and said method further comprises the steps of:
    lowering a second run of said belt along said conveyor system from a second upper position, so that a leading end of said second run advances from said second upper position to said lower position; and
    splicing said leading end of said second run of said belt to said leading end of said first run of said belt where said leading ends meet at said lower position along said slope.

6. The method of claim 2, wherein the step of positioning said belt in frictional engagement with at least one stationary plate comprises:
    positioning said belt intermediate first and second said stationary plates, said second stationary plate being mounted to said support means so that said first plate is forced toward said second plate as said fluid pressure is added to said bladder.

7. The method of claim 2, wherein the step of adding fluid pressure to said inflatable bladder comprises selectively supplying hydraulic pressure to said inflatable bladder.

8. The method of claim 2, wherein the step of adding fluid pressure to said inflatable bladder comprises selectively supplying pneumatic pressure to said inflatable bladder.

9. The method of claim 1, wherein the step of engaging said run of said belt with controllable brake means comprises engaging said run of said belt with first and second controllable brake assemblies.

10. The method of claim 9, wherein the step of controlling the rate at which said run of belt advances by adjusting said braking force comprises:
   setting said braking force which is exerted by said first brake assembly at an amount which retards but still permits said advance of said run of said belt due to said weight of said run; and
   selectively adjusting said braking force which is exerted by said second brake assembly so as to selectively increase and decrease said rate of advance of said run.

11. The method of claim 10, wherein the step of engaging said run of said belt with first and second brake assemblies comprises engaging said run of said belt with first and second brake assemblies which are spaced apart from one another longitudinally with respect to said run of said belt.

12. The method of claim 11, wherein the step of engaging said run of said belt with first and second brake assemblies further comprises the step of spacing said second brake assembly upstream of said first brake assembly, with respect to the direction which said run of said belt advances.

13. The method of claim 11, further comprising the step of anchoring said first and second spaced-apart brake assemblies independently of one another.

14. An apparatus for deploying a run of belt on a conveyor belt system which extends down a slope, said apparatus comprising:
   means for lowering said run of belt along said conveyor belt system using the weight of said run of belt;
   controllable brake means for engaging said run of belt at an upper position along said slope, said brake means being configured to permit selective adjustment of braking force which is exerted thereby on said run of belt;
   tension means for applying tension to a leading end of said run of belt at a lower position along said slope; and
   means for selectively adjusting said braking force which is exerted by said brake means so as to control the rate at which said run of belt advances down said slope along said conveyor belt system.

15. The apparatus of claim 14, wherein said means for lowering said run of belt along said system comprises a reel assembly rotatably supporting a roll of said belt, said reel assembly being positionable adjacent said upper position along said slope so that said weight of said run of belt unwinds said belt from said roll.

16. The apparatus of claim 14, wherein said controllable brake means comprises first and second controllable brake assemblies, said brake assemblies being independently controllable and being positionable at locations on said belt which are spaced apart longitudinally with respect to said run of belt.

17. The apparatus of claim 15, wherein each said brake assembly comprises:
   at least one substantially stationary plate means, said plate means being configured to extend across the width of said belt so as to frictionally engage said run of belt;
   support means positioned on a side of said plate means opposite said belt; and
   an inflatable bladder positioned intermediate said support means and said plate means so that said plate means is biased against said belt in response to an increase in fluid pressure in said bladder, so that said plate means exerts said braking force against said belt.

18. The apparatus of claim 17, wherein said means for selectively adjusting said braking force which is exerted by said brake means comprises means for selectively adjusting said fluid pressure in said inflatable bladder.

19. The apparatus of claim 14, wherein said tension means comprises:
   a cable connected to said leading end of said run of belt; and
   means for pulling said cable so as to apply said tension to said belt.

20. The apparatus of claim 19, wherein said means for pulling said cable comprises motive means connected to said cable.

21. The apparatus of claim 20, wherein said motive means comprises a vehicle attached to said cable.

22. The apparatus of claim 20, wherein said means for pulling said cable so as to apply said tension to said belt further comprises:
   a first block in engagement with said cable between said end of said run of belt and said motive means, said first block being positioned over said conveyor belt system so as to maintain said cable in alignment with said system from said block to said leading end of said run of belt.

23. The apparatus of claim 22, wherein said means for pulling said cable further comprises:
   a second block, said second block being in engagement with said cable between said first block and said motive means and being spaced laterally from said conveyor belt system so as to permit pull to be applied by said motive means in a direction independent of the alignment of said conveyor belt system while permitting said first block to maintain said cable in alignment with said system.

* * * * *